United States Patent
Hickle et al.

(10) Patent No.: US 10,637,801 B2
(45) Date of Patent: Apr. 28, 2020

(54) ROUTING TOPOLOGY FOR DIGITAL SIGNALS WITH RESISTIVE COMBINERS FOR REDUCED JITTER

(71) Applicant: BAE Systems Information and Electronic Systems Integration Inc., Nashua, NH (US)

(72) Inventors: Mark D. Hickle, Nashua, NH (US); Joseph D. Cali, Nashua, NH (US); Lawrence J. Kushner, Andover, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 118 days.

(21) Appl. No.: 15/963,594

(22) Filed: Apr. 26, 2018

(65) Prior Publication Data

US 2019/0334838 A1    Oct. 31, 2019

(51) Int. Cl.
*H04L 12/931* (2013.01)
*H04L 12/861* (2013.01)

(52) U.S. Cl.
CPC .............. *H04L 49/40* (2013.01); *H04L 49/90* (2013.01)

(58) Field of Classification Search
CPC ......... H04L 49/40; H04L 49/90; H04L 49/25; H04L 49/252; H04L 49/3063
See application file for complete search history.

(56) References Cited

U.S. PATENT DOCUMENTS

| | | | | |
|---|---|---|---|---|
| 5,598,179 A | * | 1/1997 | Orlen | G09G 3/3625 345/208 |
| 6,222,416 B1 | * | 4/2001 | Edeler | H03F 3/26 330/255 |
| 6,400,715 B1 | * | 6/2002 | Beaudoin | H04L 49/25 370/392 |
| 8,194,690 B1 | * | 6/2012 | Steele | H04L 49/90 370/412 |
| 8,749,282 B1 | * | 6/2014 | Basawapatna | H03L 7/104 327/147 |
| 9,954,541 B1 | * | 4/2018 | Goyal | H03L 7/099 |
| 2002/0105948 A1 | * | 8/2002 | Glomb | H04L 49/25 370/369 |
| 2008/0180130 A1 | * | 7/2008 | Hayami | H03K 19/0005 326/30 |

(Continued)

*Primary Examiner* — Chi H Pham
*Assistant Examiner* — Weibin Huang
(74) *Attorney, Agent, or Firm* — Finch & Maloney PLLC; Scott J. Asmus

(57) ABSTRACT

A signal routing circuit is disclosed which employs resistive combiners to reduce signal jitter. A signal routing circuit configured according to an embodiment comprises an input stage including a plurality of buffer circuits. Each of the buffer circuits is controlled by a selection signal to enable an input signal at an input port of the buffer circuit to generate an output signal at an output port of the buffer circuit. The signal routing circuit also includes a plurality of resistors to couple the output port of each of the buffer circuits of the input stage to a summing junction. The signal routing circuit further includes an output stage including an additional buffer circuit. The input port of the additional buffer circuit is coupled to the summing junction, and the output port of the additional buffer circuit is configured to provide the routed output signal based on the selection signals.

16 Claims, 6 Drawing Sheets

(56) References Cited

U.S. PATENT DOCUMENTS

| | | | | |
|---|---|---|---|---|
| 2014/0270004 A1* | 9/2014 | Christensen | .......... | H04L 27/152 375/327 |
| 2015/0054519 A1* | 2/2015 | Tomonaga | ........... | G01R 31/396 324/434 |
| 2018/0341478 A1* | 11/2018 | Anderson | ............. | G06F 9/3001 |
| 2019/0227963 A1* | 7/2019 | Ooi | ......................... | H01L 25/18 |

* cited by examiner

ROUTING TOPOLOGY FOR DIGITAL SIGNALS WITH RESISTIVE COMBINERS FOR REDUCED JITTER

FIELD OF DISCLOSURE

The present disclosure relates to signal routing, and more particularly, to a signal routing topology employing resistive combiners for reduced jitter.

BACKGROUND

Digital signals are typically routed through a circuit, for example an integrated circuit, using active multiplexers which employ logic gates comprising transistors and other active components. These multiplexers can be used for example to select between different clock sources or other digital signals. One problem with the use of such multiplexers is that the active circuitry upon which they are built can contribute significant noise which may limit the phase noise floor of the signal, and consequently the jitter of a clock signal. Certain applications, such as high-performance data converters, frequency synthesizers for electronic warfare systems, and high throughput microwave backhaul systems, to name a few, generally require clock sources with extremely low jitter.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts.

Although the following Detailed Description will proceed with reference being made to illustrative embodiments, many alternatives, modifications, and variations thereof will be apparent to those skilled in the art.

DETAILED DESCRIPTION

Signal routing circuits are disclosed which employ passive resistive signal combiners to reduce phase noise and jitter in the routed signal. The signal routing circuits can be used, for example, to select between different clock sources or other digital signals while providing improved performance, compared to routers that employ active multiplexers, as will be explained in greater detail below. In some embodiments, the resistors of the resistive signal combiners are selected such that the thermal noise generated by the combiners, if any, is substantially lower (e.g., by 10 dB or more) than the power level of the signals to be routed.

The disclosed signal routing circuits can be employed, for example, in a communication platform or computing system, although any number of other applications having a need for the routing of digital signals with reduced thermal noise, phase noise, and/or jitter will be apparent. In accordance with an embodiment, a signal routing circuit, also referred to as a mux-less signal routing topology, comprises an input stage, a network of signal combining resistors, a summing junction, and an output stage. The input stage includes a number of buffer circuits, each configured for control by a selection signal which enables an input signal at an input port of the buffer circuit to generate an output signal at an output port of the buffer circuit. The resistor network is configured to couple the output port of each of the buffer circuits of the input stage to a summing junction. The output stage includes an additional buffer circuit. The input port of the additional buffer circuit is coupled to the summing junction, and the output port is configured to provide the routed output signal based on the selection signals.

As will be appreciated in light of this disclosure, the signal routing circuits described herein may allow for improved performance, compared to existing signal routing circuits which employ active multiplexers, which may make the disclosed signal routing circuits more suitable for use in a variety of applications such as high-performance data converters, frequency synthesizers for electronic warfare systems, and high throughput microwave backhaul systems, for example. The disclosed signal routing circuits can be implemented on a broad range of platforms including radios, data communication devices, smart phones, personal computers, laptop computers, tablets, and so forth.

Figure 1:
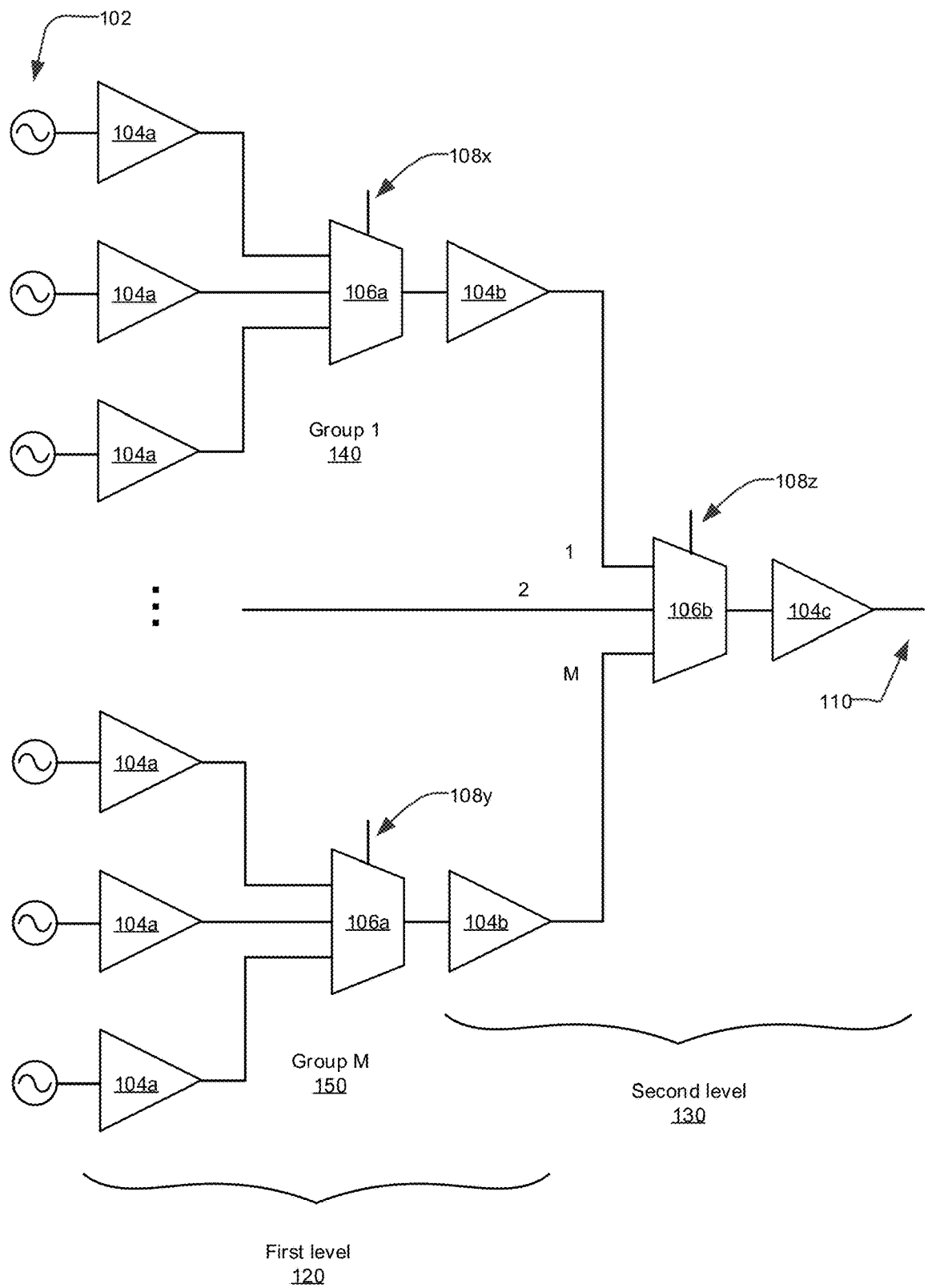
FIG. 1 is a circuit diagram of a multiplexer based routing circuit.

FIG. 1 is a circuit diagram of a multiplexer based routing circuit 100. The routing circuit 100 is shown to include a network of buffer circuits 104, linked together by active multiplexer circuits 106. Examples of buffer circuits include, but are not limited to, an amplifier, a unity gain amplifier, an attenuator, a delay element, and an impedance transformer. The multiplexer circuits 106 are configured to select one of the input signals provided to the multiplexer to be routed to the output of the multiplexer, based on selection signals 108. Thus, the multiplexer circuits 106 may be configured to route signals from one buffer circuit to another buffer circuit, and eventually to an output of the routing circuit, under the control of selection signals 108.

In some embodiments, the routing circuit 100 may be organized in a hierarchical tree structure comprising a number of levels. In this example there are two levels 120 and 130 in which M groups of routing circuits (140, . . . 150) at the first level 120 funnel into one routing circuit at the second level 130. Buffer circuits 104a are organized into one or more input stages at the first level to receive input signals from signal sources 102. Signal source 102 may be a clock source or other digital signal source. Multiplexers 106a, of the first level, are configured to select (route) an input signal from one of the input stage buffers 104a on to the next stage, based on the value of a selection signal 108x or 108y provided to the multiplexer. The signal that is selected by the multiplexer is routed on to buffer 104b which is both the output stage of the first level 120 and the input stage of the second level 130. The second level 130 is configured to further sub-select input signals from each of the first level groups of routing circuits (140, . . . 150) using multiplexer 106b. The sub-selection is based on the provided selection signal 108z. Buffer circuit 104c at the output stage of the second (and final) level, in this example, is configured to provide the routed output signal 110.

Figure 2:
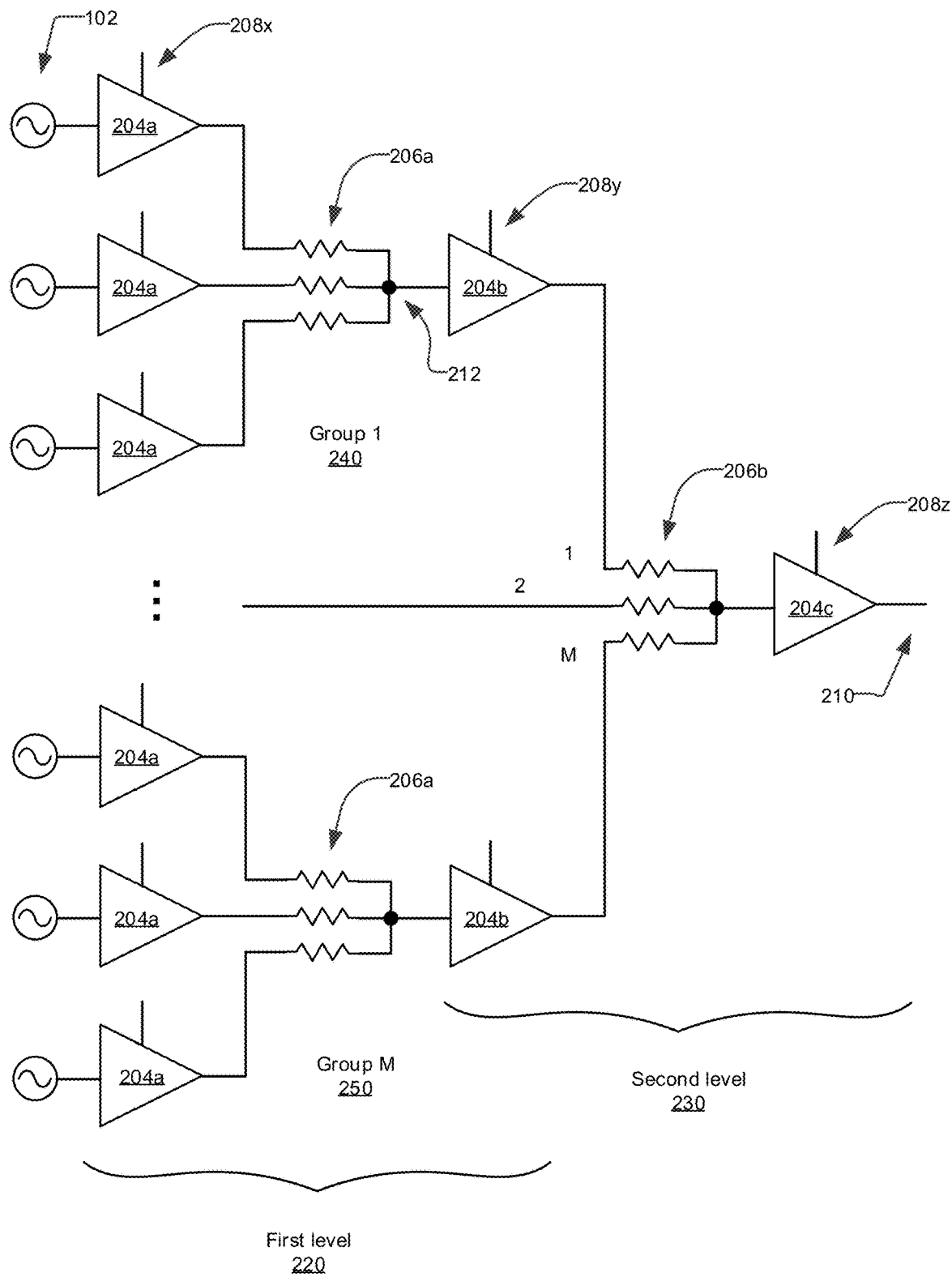
FIG. 2 is a circuit diagram of a routing circuit employing resistive combiners, configured in accordance with certain of the embodiments disclosed herein.

FIG. 2 is a circuit diagram of a routing circuit 200 employing resistive combiners, configured in accordance with certain of the embodiments disclosed herein. The routing circuit 200 is shown to include a network of buffer circuits 204, linked together by passive resistive signal combiners 206. Buffer circuits 204, similar to buffer circuits 104 previously described, may include amplifiers, unity gain amplifiers, attenuators, delay elements, impedance transformers, and the like. Buffer circuits 204 also include a selection port to enable them to be controlled through the application of selection signals 208. Thus, an input signal to each buffer circuit may result in the generation of an output signal from that buffer circuit, based on the selection signal. The passive resistive signal combiners 206 are configured to combine the outputs of the buffer circuits 204 at a summing junction 212 which is coupled to the next buffer circuit.

Although the signal combiners 206, in this embodiment, do not provide the signal selection functionality of a multiplexer, that functionality is realized by activating the buffers in the path of the desired signal source, and deactivating other buffers in the paths of the undesired sources. In this manner, a multiplexing effect is achieved, with the benefit of a lower phase noise floor compared to the use of active multiplexers. This is possible, at least in part, because the thermal noise generated by the resistors may be less than the noise generated by the active multiplexers which includes, for example, thermal noise, shot noise, 1/f noise, and other types of noise. Reduced phase noise is equivalent to reduced jitter, as jitter describes uncertainties in a clock signal in the time domain, whereas phase noise describes the same effect in the frequency domain. For example, jitter can be calculated as an RMS value (over a large number of clock cycles) of the temporal displacement of the high-to-low and low-to-high transitions of the clock signal from their ideal values due to random variation over time. Phase noise is a frequency-domain interpretation of this random variation in the period of the clock signal. Because the period is varying in a random manner, the clock signal contains spectral content at frequencies other than the nominal frequency.

Phase noise can be converted into RMS jitter in accordance with the following equations:

$$\text{Jitter} = \frac{\sqrt{2 \cdot N}}{2\pi f_0}$$

$$N = \int_{f_1}^{f_2} \mathcal{L}(f) df$$

Where $\mathcal{L}(f)$ is the phase noise of the clock signal as a function of frequency, N is the total noise power contained in the spectrum of interest, bounded by the frequencies $f_1$ and $f_2$, and $f_0$ is the fundamental frequency of the clock.

In some embodiments, the routing circuit 200 may be organized in a hierarchical tree structure comprising a number of levels. In this example there are two levels 220 and 230 in which M groups of routing circuits (240, . . . 250) at the first level 220 funnel into one routing circuit at the second level 230, although in general any desired number of levels may be employed. Buffer circuits 204a are organized into one or more input stages at the first level to receive input signals from signal sources 102, which may be clock sources or other digital signal sources. Resistive combiners 206a, of the first level, are configured to combine the input signals from the input stage buffers 204a to a summing junction 212, although typically, only one of the input signals in each group of buffers 204a, is selected based on the value of selection signals 208x. The selected signals are routed on to buffer 204b which is both the output stage of the first level 220 and the input stage of the second level 230. The second level 230 is configured to further sub-select input signals from each of the first level groups of routing circuits (240, . . . 250) based on selection signal 208y applied to buffer circuits 204b. The outputs of buffer circuits 204b are further combined by resistive combiner 206b and then provided to buffer circuit 204c. Buffer circuit 204c at the output stage of the second (and final) level, in this example, is configured to provide the routed output signal 210.

Figure 3:
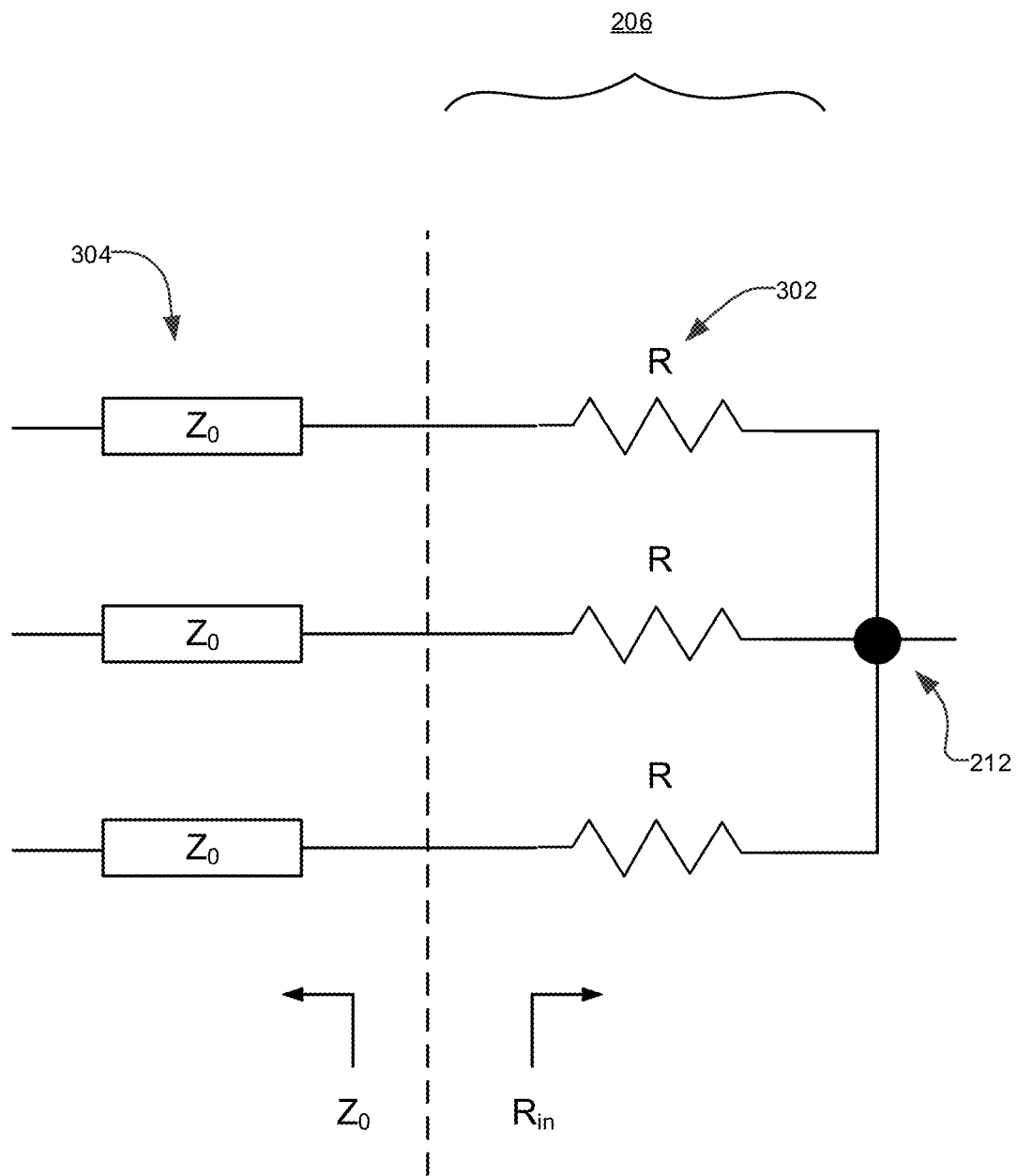
FIG. 3 is a circuit diagram of a signal combining resistor network, configured in accordance with certain of the embodiments disclosed herein.

FIG. 3 is a circuit diagram of the passive signal combining resistor network 206, configured in accordance with certain of the embodiments disclosed herein. Each of N resistors 302 of the signal combiner 206 is coupled to a buffer circuit 204 through a transmission line 304 with a characteristic impedance of $Z_0$. If the transmission line between the signal source and the summing junction is electrically long (e.g., a significant fraction of a wavelength), then care is taken to ensure that the point of combination presents a matched load to the transmission line to eliminate reflections. In some embodiments, the value of the resistors 302 is chosen to achieve this matching, based on the number of resistors N, and on the characteristic impedance, according to the following equation:

$$R = \left(\frac{N-2}{N}\right) Z_0, \qquad \text{equ(1)}$$

This presents a matched impedance $R_{in}$ (looking into the resistor network) equal to $Z_0$ (looking into the transmission lines) under the assumptions that the transmission lines are terminated in matched impedances ($Z_0$), and that the load connected to the output is a high impedance load which can be neglected. This is usually true for buffer circuits which typically have high impedance inputs. In such case, $$R_{in} = R + \left(\frac{R + Z_0}{N - 1}\right), \qquad \text{equ(2)}$$

and substituting the value of R, from equation (1) above into equation (2), yields $$R_{in} = Z_0$$

as desired.

Figure 4:
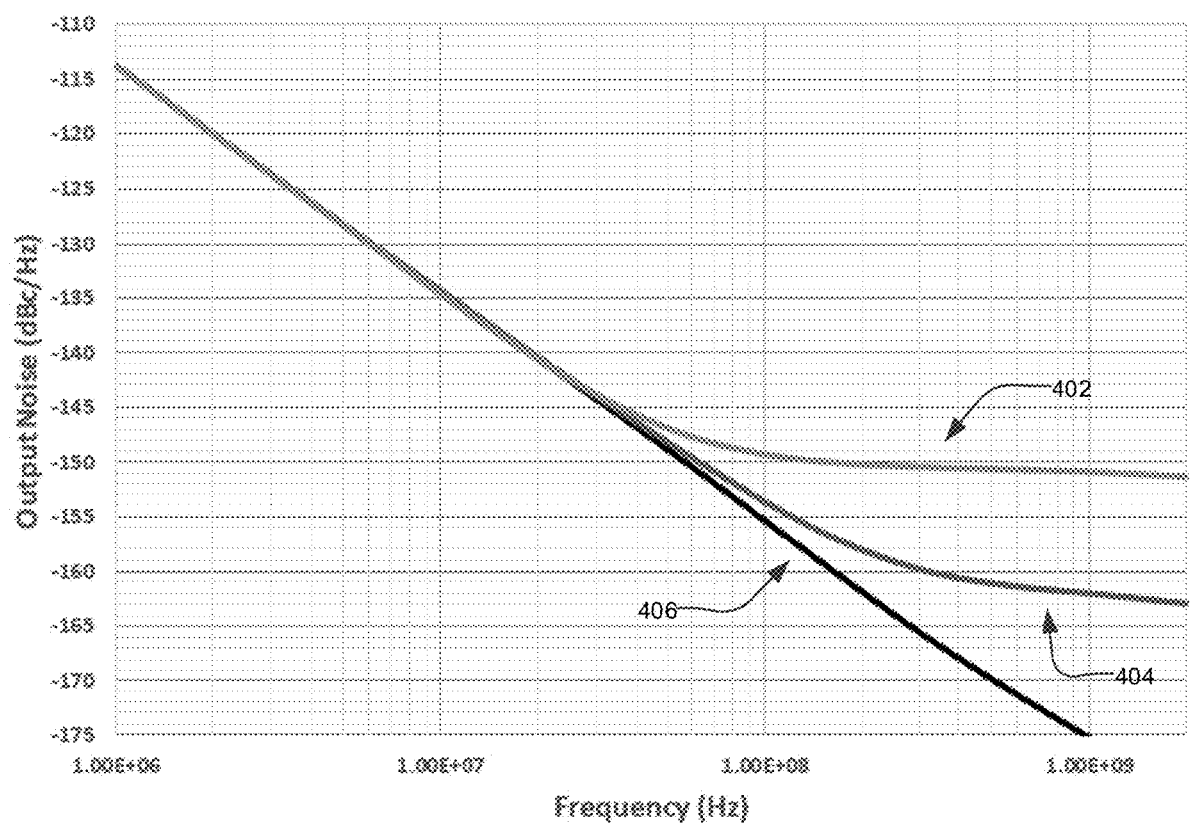
FIG. 4 is a plot illustrating output noise versus carrier frequency offset, for the routing circuit, configured in accordance with certain of the embodiments disclosed herein.

FIG. 4 is a plot 400 illustrating output noise versus carrier frequency offset, for the routing circuit, configured in accordance with certain of the embodiments disclosed herein. Plot line 406 shows the intrinsic output phase noise measured at the clock signal source (e.g., a lumped L-C voltage controlled oscillator), as a reference. Plot line 402 shows the resulting phase noise after passing through two levels of multiplexers and buffers (e.g., the routing circuit of FIG. 1). It can be seen that the phase noise of the clock is degraded by more than 25 dB. In contrast, plot line 404 shows the resulting phase noise after passing through two levels of the disclosed mux-less routing topology (e.g., the routing circuit of FIG. 2). In this case it can be seen that the phase noise is reduced by 12 dB compared to plot line 402.

Methodology

Figure 5:
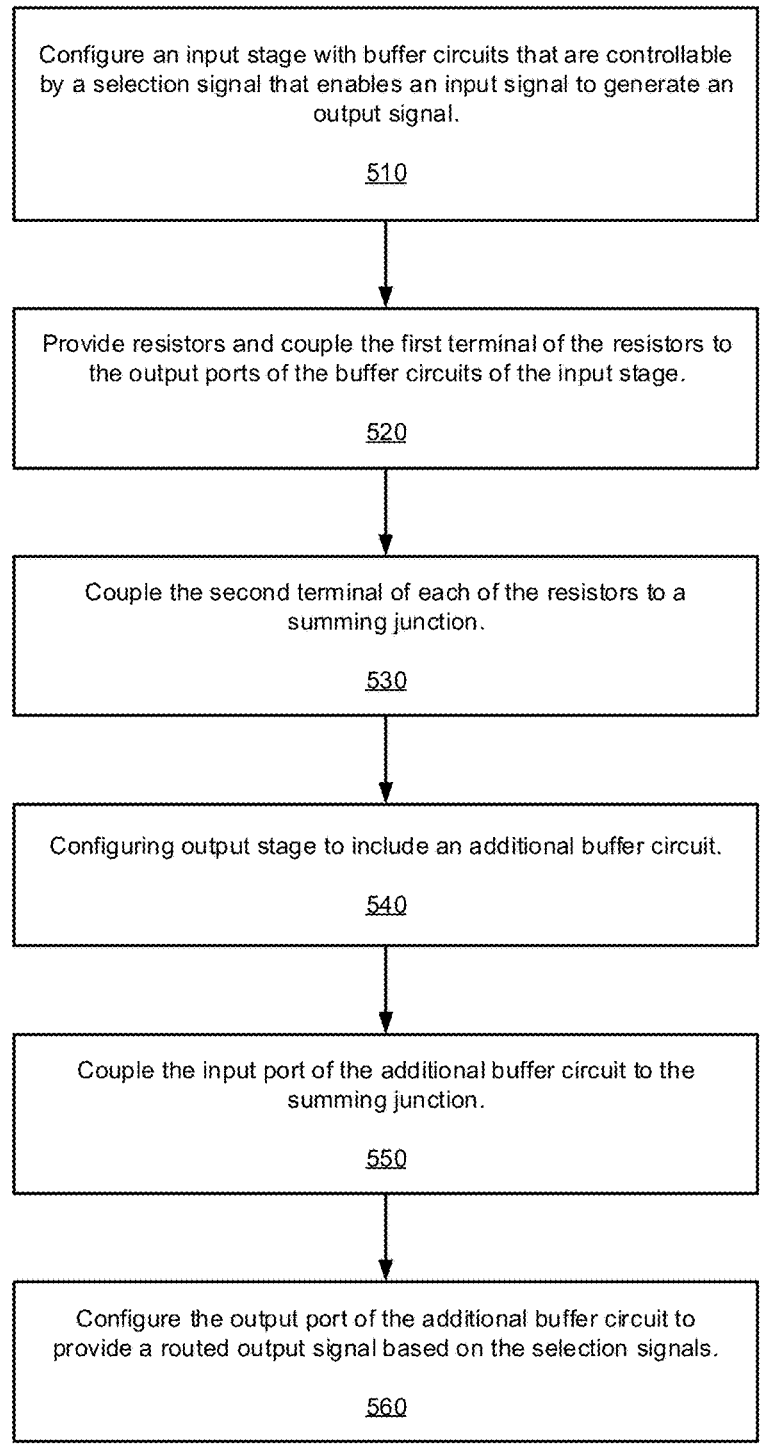
FIG. 5 is a flowchart illustrating a methodology for fabrication of the routing circuit, in accordance with certain of the embodiments disclosed herein.

FIG. 5 is a flowchart illustrating an example method 500 for fabrication of a signal routing circuit, in accordance with an embodiment of the present disclosure. As can be seen, example method 500 includes a number of phases and sub-processes, the sequence of which may vary from one embodiment to another. However, when considered in the aggregate, these phases and sub-processes form a fabrication process for a signal routing circuit in accordance with certain of the embodiments disclosed herein. These embodiments can be implemented, for example using the system architecture illustrated in FIGS. 2 and 3, as described above. However other system architectures can be used in other embodiments, as will be apparent in light of this disclosure. To this end, the correlation of the various functions shown in FIG. 5 to the specific components illustrated in FIGS. 2 and 3 is not intended to imply any structural and/or use limitations. Rather other embodiments may include, for example, varying degrees of integration wherein multiple functionalities are effectively performed by one system. For example, in an alternative embodiment a single module can be used to perform all of the functions of method 500. Thus, other embodiments may have fewer or more modules and/or sub-modules depending on the granularity of implementation. Numerous variations and alternative configurations will be apparent in light of this disclosure.

As illustrated in FIG. 5, in one embodiment signal routing circuit fabrication method 500 commences by configuring, at operation 510, an input stage to include a number of buffer circuits. Each of the buffer circuits is controlled by a selection signal, applied to a selection port of the buffer circuit. The selection signal may enable an input signal at an input port of the buffer circuit to generate an output signal at an output port of the buffer circuit. In some embodiments, the buffer circuit may be an amplifier, an attenuator, a delay element, or an impedance transformer.

Next, at operation 520, a number of resistors are provided, wherein each resistor is associated with one of the buffer circuits of the input stage. A first terminal of each of the resistors is coupled to the output port of the associated buffer circuit. At operation 530, a second terminal of each of the resistors is coupled to a summing junction so that the outputs of the buffer circuits are combined, through the resistors, at the summing junction.

At operation 540, an output stage is configured to include an additional buffer circuit. At operation 550, the input port of the additional buffer circuit is coupled to the summing junction. At operation 560, the output port of the additional buffer circuit is configured to provide the routed output signal based on the selection signals applied to buffer circuits.

Of course, in some embodiments, additional operations may be performed, as previously described in connection with the system. These additional operations may include, for example, providing transmission lines to couple the output port of the buffer circuits of the input stage to the first terminal of the associated resistor and choosing a resistance value of the resistor to be proportional to a characteristic impedance of the transmission line. The proportionality scale factor may be based on the number of resistors or number of output ports being combined at the summing junction. Additionally, in some embodiments, the resistors may be selected or otherwise configured to generate thermal noise power that is substantially lower (e.g., an order of magnitude or more) than the anticipated power of the input signal.

Example Platform

Figure 6:
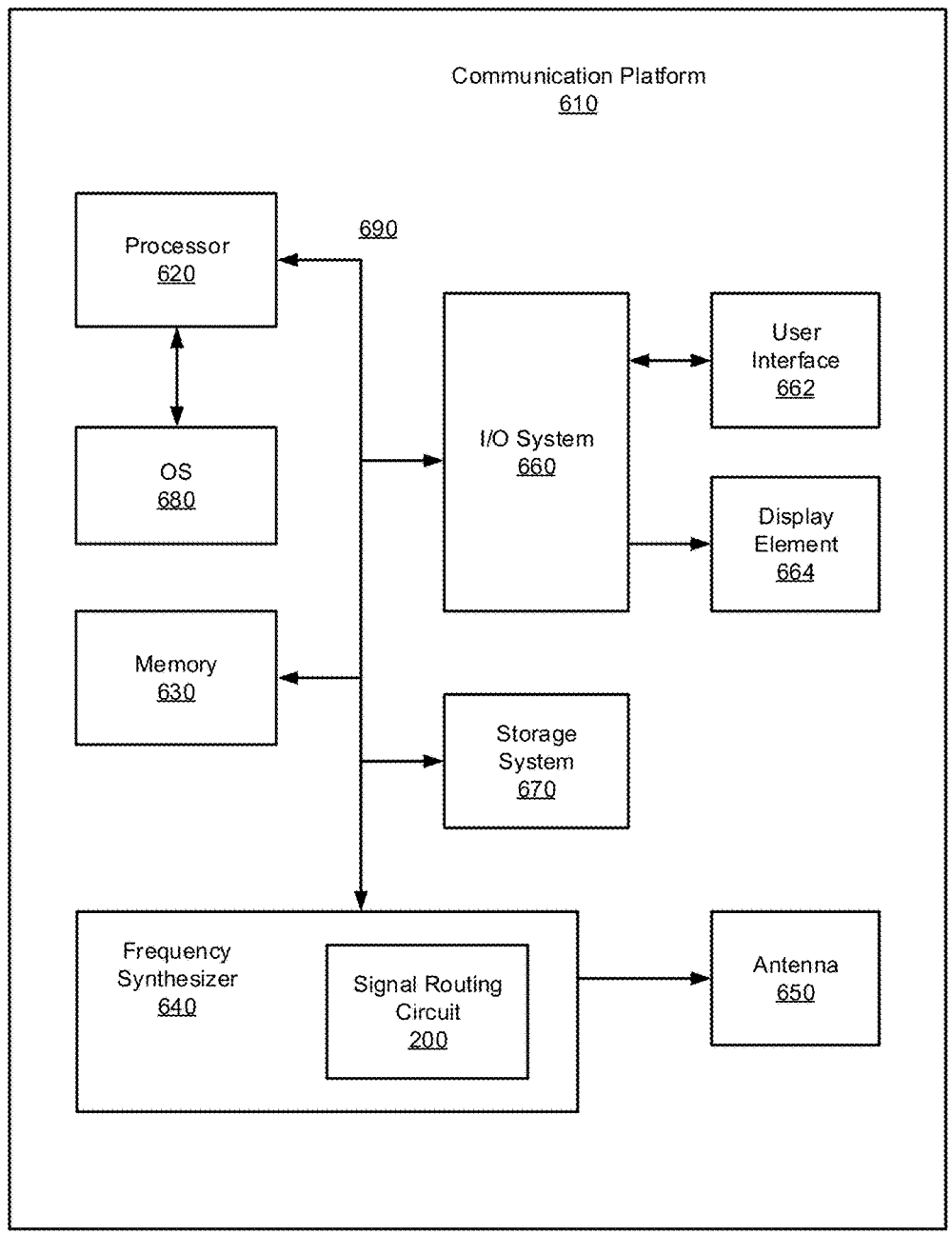
FIG. 6 is a block diagram schematically illustrating a communication platform employing the signal routing circuit, in accordance with certain of the embodiments disclosed herein.

FIG. 6 is a block diagram 600 schematically illustrating a communication platform 610 including a frequency synthesizer 640 which employs the signal routing circuit 200, in accordance with certain of the embodiments disclosed herein. In some embodiments, communications platform 610 may be hosted on, or otherwise be incorporated into, a radio, electronic warfare system, microwave backhaul system, data communication device, personal computer, workstation, laptop computer, tablet, portable computer, and so forth. Any combination of different devices may be used in certain embodiments.

In some embodiments, platform 610 may comprise any combination of a processor 620, a memory 630, a frequency synthesizer 640 employing signal routing circuit 200, antenna 650, an input/output (I/O) system 660, a user interface 662, a display element 664, and a storage system 670. As can be further seen, a bus and/or interconnect 690 is also provided to allow for communication between the various components listed above and/or other components not shown. Other componentry and functionality not reflected in the block diagram of FIG. 6 will be apparent in light of this disclosure, and it will be appreciated that other embodiments are not limited to any particular hardware configuration.

Processor 620 can be any suitable processor, and may include one or more coprocessors or controllers, such as an audio processor, a graphics processing unit, or hardware accelerator, to assist in control and processing operations associated with platform 610. In some embodiments, the processor 620 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 620 may be implemented as a complex instruction set computer (CISC) or a reduced instruction set computer (RISC) processor.

Memory 630 can be implemented using any suitable type of digital storage including, for example, flash memory and/or random access memory (RAM). In some embodiments, the memory 630 may include various layers of memory hierarchy and/or memory caches as are known to those of skill in the art. Memory 630 may be implemented as a volatile memory device such as, but not limited to, a RAM, dynamic RAM (DRAM), or static RAM (SRAM) device. Storage system 670 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 670 may comprise technology to increase the storage performance enhanced protection for valuable digital media when multiple hard drives are included.

Processor 620 may be configured to execute an Operating System (OS) 680 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with platform 610, and therefore may also be implemented using any suitable existing or subsequently-developed platform.

I/O system 660 may be configured to interface between various I/O devices and other components of platform 610. I/O devices may include, but not be limited to, user interface 662 and display element 664. User interface 662 may include other devices (not shown) such as a touchpad, keyboard, mouse, microphone and speaker, trackball or scratch pad, and camera. I/O system 660 may include a graphics subsystem configured to perform processing of images for rendering on the display element 664. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 620 or any chipset of platform 610.

It will be appreciated that in some embodiments, the various components of platform 610 may be combined or integrated in a system-on-a-chip (SoC) architecture. In some embodiments, the components may be hardware components, firmware components, software components or any suitable combination of hardware, firmware or software.

Frequency synthesizer 640 is configured to generate signals with desired frequency characteristics which may then be transmitted through antenna 650, for example as part of an electronic warfare system, a microwave transmission system, or other suitable application. Frequency synthesizer 640 may employ signal routing circuit 200 which is configured to select a given digital signal from among many possible signal sources, using the resistive combining techniques, as previously described, to reduce jitter, phase noise, and other undesirable characteristics. In some embodiments, frequency synthesizer 640 may include RF components such as amplifiers, filters, mixers, and the like, to transform baseband signal into an RF signal for transmission. Signal routing circuit 200 may include any or all of the components and features illustrated in FIGS. 2 and 3, as described above. These components can be implemented or otherwise used in conjunction with a variety of suitable software and/or hardware that is coupled to or that otherwise forms a part of platform 610.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. Other componentry and functionality not reflected in the illustrations will be apparent in light of this disclosure, and it will be appreciated that other embodiments are not limited to any particular hardware or software configuration. Thus, in other embodiments platform 610 may comprise additional, fewer, or alternative subcomponents as compared to those included in the example embodiment of FIG. 6.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). In some embodiments, the hardware may be modeled or developed using hardware description languages such as, for example Verilog or VHDL. Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, or one or more embedded routines configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads or parallel processes in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smart phones, and other processor-based or functional systems. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

One example embodiment of the present disclosure provides a signal routing circuit. The signal routing circuit includes: an input stage including first and second buffer circuits, each of the first and second buffer circuits controlled by a corresponding selection signal, the corresponding selection signal to enable an input signal at an input port of the corresponding buffer circuit to generate an output signal at an output port of the corresponding buffer circuit; a summing junction; a first resistor having first and second terminals, the first terminal of the first resistor coupled to the output port of the first buffer circuit, and the second terminal of the first resistor coupled to the summing junction; a second resistor having first and second terminals, the first terminal of the second resistor coupled to the output port of the second buffer circuit, and the second terminal of the second resistor coupled to the summing junction; and an output stage including a third buffer circuit, the third buffer circuit controlled by a corresponding selection signal, the corresponding selection signal to enable an input signal at an input port of the third buffer circuit to generate an output signal at an output port of the third buffer circuit, the input port of the third buffer circuit coupled to the summing junction, and the output port of the third buffer circuit to provide a routed output signal.

In some cases, the input signals, the selection signals, the output signals, and the routed output signal are digital signals. In some cases, the first and second buffer circuits of the input stage and the third buffer circuit of the output stage are at least one of an amplifier, an attenuator, a delay element, and an impedance transformer. In some cases, the input stage is a first input stage, and the third buffer circuit of the output stage is part of a second input stage of the signal routing circuit. In some cases, the signal routing circuit includes: a first digital clock generation circuit coupled to the input port of the first buffer circuit of the input stage, to provide a first digital clock signal as the input signal to the first buffer circuit; and a second digital clock generation circuit coupled to the input port of the second buffer circuit of the input stage, to provide a second digital clock signal as the input signal to the second buffer circuit. In some cases, the signal routing circuit includes: a transmission line to couple the output port of the first buffer circuit of the input stage to the first terminal of the first resistor, wherein a resistance value of the first resistor is chosen to be proportional to a characteristic impedance of the transmission line. In some such cases, the first and second resistors are included in a plurality of resistors, the resistance value of the first resistor is chosen to be proportional to a characteristic impedance of the transmission line with a proportionality scale factor based on the number of the plurality of resistors.

In some cases, thermal noise power generated by the first resistor is 10 dB or more lower than a power of the input signal at the input port of the first buffer circuit, and thermal noise power generated by the second resistor is 10 dB or more lower than a power of the input signal at the input port of the second buffer circuit. In some cases, the signal routing circuit is employed to route digital signals in at least one of a data converter system, a frequency synthesizer system, and a microwave transmission system.

Another example embodiment of the present disclosure provides a frequency synthesizer system. The frequency synthesizer system includes: a plurality of signal generation circuits to generate tuned frequency signals; a signal routing circuit including an input stage including first and second buffer circuits, each of the first and second buffer circuits controlled by a corresponding selection signal, the corresponding selection signal to enable an input signal at an input port of the corresponding buffer circuit to generate an output signal at an output port of the corresponding buffer circuit; a summing junction; a first resistor having first and second terminals, the first terminal of the first resistor coupled to the output port of the first buffer circuit, and the second terminal of the first resistor coupled to the summing junction; a second resistor having first and second terminals, the first terminal of the second resistor coupled to the output port of the second buffer circuit, and the second terminal of the second resistor coupled to the summing junction; and an output stage including a third buffer circuit, the third buffer circuit controlled by a corresponding selection signal, the corresponding selection signal to enable an input signal at an input port of the third buffer circuit to generate an output signal at an output port of the third buffer circuit, the input port of the third buffer circuit coupled to the summing junction, and the output port of the third buffer circuit to provide a routed output signal; and a transmitter circuit to transmit the routed output signal.

In some cases, the first and second buffer circuits of the input stage and the third buffer circuit of the output stage are at least one of an amplifier, an attenuator, a delay element, and an impedance transformer. In some cases, frequency synthesizer system further includes a transmission line to couple the output port of the first buffer circuit of the input stage to the first terminal of the first resistor, wherein a resistance value of the first resistor is chosen to be proportional to a characteristic impedance of the transmission line. In some such cases, the first and second resistors are included in a plurality of resistors, the resistance value of the first resistor is chosen to be proportional to a characteristic impedance of the transmission line with a proportionality scale factor based on the number of the plurality of resistors. In some cases, the frequency synthesizer system is employed to generate signals for an electronic warfare system.

Another example embodiment of the present disclosure provides a method for fabricating a signal routing circuit. The method includes: configuring an input stage to include first and second buffer circuits, each of the first and second buffer circuits controlled by a corresponding selection signal, the corresponding selection signal to enable an input signal at an input port of the corresponding buffer circuit to generate an output signal at an output port of the corresponding buffer circuit; providing a summing junction; providing a first resistor having first and second terminals, and a second resistor having first and second terminals; coupling the first terminal of the first resistor to the output port of the first buffer circuit, and the second terminal of the first resistor to the summing junction; coupling the first terminal of the second resistor to the output port of the second buffer circuit, and the second terminal of the second resistor to the summing junction; and configuring an output stage to include a third buffer circuit, the third buffer circuit controlled by a corresponding selection signal, the corresponding selection signal to enable an input signal at an input port of the third buffer circuit to generate an output signal at an output port of the third buffer circuit, the input port of the third buffer circuit coupled to the summing junction, and the output port of the third buffer circuit to provide a routed output signal.

In some cases, the first and second buffer circuits of the input stage and the third buffer circuit of the output stage are at least one of an amplifier, an attenuator, a delay element, and an impedance transformer. In some cases, the method further includes: coupling a first digital clock generation circuit to the input port of the first buffer circuit of the input stage, to provide a first digital clock signal as the input signal to the first buffer circuit; and coupling a second digital clock generation circuit to the input port of the second buffer circuit of the input stage, to provide a second digital clock signal as the input signal to the second buffer circuit. In some cases, the method further includes: providing a transmission line to couple the output port of the first buffer circuit of the input stage to the first terminal of the first resistor, wherein a resistance value of the first resistor is chosen to be proportional to a characteristic impedance of the transmission line. In some such cases, the first and second resistors are included in a plurality of resistors, the resistance value of the first resistor is chosen to be proportional to a characteristic impedance of the transmission line with a proportionality scale factor based on the number of the plurality of resistors. In some cases, thermal noise power generated by the resistors is lower than a power of the input signal by 10 dB or more.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A signal routing circuit comprising:
an input stage including first and second buffer circuits, each of the first and second buffer circuits controlled by a corresponding selection signal, the corresponding selection signal to enable an input signal at an input port of the corresponding buffer circuit to generate an output signal at an output port of the corresponding buffer circuit;

a summing junction;
a first resistor having first and second terminals, the first terminal of the first resistor coupled to the output port of the first buffer circuit, and the second terminal of the first resistor coupled to the summing junction, wherein thermal noise power generated by the first resistor is 10 dB or more lower than a power of the input signal at the input port of the first buffer circuit;
a second resistor having first and second terminals, the first terminal of the second resistor coupled to the output port of the second buffer circuit, and the second terminal of the second resistor coupled to the summing junction, wherein thermal noise power generated by the second resistor is 10 dB or more lower than a power of the input signal at the input port of the second buffer circuit; and
an output stage including a third buffer circuit, the third buffer circuit controlled by a corresponding selection signal, the corresponding selection signal to enable an input signal at an input port of the third buffer circuit to generate an output signal at an output port of the third buffer circuit, the input port of the third buffer circuit coupled to the summing junction, and the output port of the third buffer circuit to provide a routed output signal.

2. The signal routing circuit of claim 1, wherein the input signals, the selection signals, the output signals, and the routed output signal are digital signals.

3. The signal routing circuit of claim 1, wherein the first and second buffer circuits of the input stage and the third buffer circuit of the output stage are at least one of an amplifier, an attenuator, a delay element, and an impedance transformer.

4. The signal routing circuit of claim 1, wherein the input stage is a first input stage, and the third buffer circuit of the output stage is part of a second input stage of the signal routing circuit.

5. The signal routing circuit of claim 1, further comprising:
a first digital clock generation circuit coupled to the input port of the first buffer circuit of the input stage, to provide a first digital clock signal as the input signal to the first buffer circuit; and
a second digital clock generation circuit coupled to the input port of the second buffer circuit of the input stage, to provide a second digital clock signal as the input signal to the second buffer circuit.

6. The signal routing circuit of claim 1, further comprising:
a transmission line to couple the output port of the first buffer circuit of the input stage to the first terminal of the first resistor, wherein a resistance value of the first resistor is chosen to be proportional to a characteristic impedance of the transmission line.

7. The signal routing circuit of claim 6, wherein the first and second resistors are included in a plurality of resistors, the resistance value of the first resistor is chosen to be proportional to a characteristic impedance of the transmission line with a proportionality scale factor based on the number of the plurality of resistors.

8. The signal routing circuit of claim 1, wherein the signal routing circuit is employed to route digital signals in at least one of a data converter system, a frequency synthesizer system, and a microwave transmission system.

9. A frequency synthesizer system comprising:
a plurality of signal generation circuits to generate tuned frequency signals;
a signal routing circuit including
an input stage including first and second buffer circuits, each of the first and second buffer circuits controlled by a corresponding selection signal, the corresponding selection signal to enable an input signal at an input port of the corresponding buffer circuit to generate an output signal at an output port of the corresponding buffer circuit;
a summing junction;
a first resistor having first and second terminals, the first terminal of the first resistor coupled to the output port of the first buffer circuit, and the second terminal of the first resistor coupled to the summing junction;
a second resistor having first and second terminals, the first terminal of the second resistor coupled to the output port of the second buffer circuit, and the second terminal of the second resistor coupled to the summing junction; and
an output stage including a third buffer circuit, the third buffer circuit controlled by a corresponding selection signal, the corresponding selection signal to enable an input signal at an input port of the third buffer circuit to generate an output signal at an output port of the third buffer circuit, the input port of the third buffer circuit coupled to the summing junction, and the output port of the third buffer circuit to provide a routed output signal;
a transmitter circuit to transmit the routed output signal; and
a transmission line to couple the output port of the first buffer circuit of the input stage to the first terminal of the first resistor,
wherein a resistance value of the first resistor is chosen to be proportional to a characteristic impedance of the transmission line with a proportionality scale factor based on the number of the plurality of resistors, and
wherein the first and second resistors are included in a plurality of resistors.

10. The frequency synthesizer system of claim 9, wherein the first and second buffer circuits of the input stage and the third buffer circuit of the output stage are at least one of an amplifier, an attenuator, a delay element, and an impedance transformer.

11. The frequency synthesizer system of claim 9, wherein the frequency synthesizer system is employed to generate signals for an electronic warfare system.

12. A method for fabricating a signal routing circuit, the method comprising:
configuring an input stage to include first and second buffer circuits, each of the first and second buffer circuits controlled by a corresponding selection signal, the corresponding selection signal to enable an input signal at an input port of the corresponding buffer circuit to generate an output signal at an output port of the corresponding buffer circuit;
providing a summing junction;
providing a first resistor having first and second terminals, and a second resistor having first and second terminals, wherein thermal noise power generate by the first and second resistors is lower than a power of the input signal by 10 dB or more;
coupling the first terminal of the first resistor to the output port of the first buffer circuit, and the second terminal of the first resistor to the summing junction;

coupling the first terminal of the second resistor to the output port of the second buffer circuit, and the second terminal of the second resistor to the summing junction; and configuring an output stage to include a third buffer circuit, the third buffer circuit controlled by a corresponding selection signal, the corresponding selection signal to enable an input signal at an input port of the third buffer circuit to generate an output signal at an output port of the third buffer circuit, the input port of the third buffer circuit coupled to the summing junction, and the output port of the third buffer circuit to provide a routed output signal.

13. The method of claim 12, wherein the first and second buffer circuits of the input stage and the third buffer circuit of the output stage are at least one of an amplifier, an attenuator, a delay element, and an impedance transformer.

14. The method of claim 12, further comprising:
coupling a first digital clock generation circuit to the input port of the first buffer circuit of the input stage, to provide a first digital clock signal as the input signal to the first buffer circuit; and coupling a second digital clock generation circuit to the input port of the second buffer circuit of the input stage, to provide a second digital clock signal as the input signal to the second buffer circuit.

15. The method of claim 12, further comprising providing a transmission line to couple the output port of the first buffer circuit of the input stage to the first terminal of the first resistor, wherein a resistance value of the first resistor is chosen to be proportional to a characteristic impedance of the transmission line.

16. The method of claim 15, wherein the first and second resistors are included in a plurality of resistors, the resistance value of the first resistor is chosen to be proportional to a characteristic impedance of the transmission line with a proportionality scale factor based on the number of the plurality of resistors.

* * * * *